Jan. 17, 1956 F. V. GRAF Re. 24,111
BRASSIERE
Original Filed June 14, 1950 2 Sheets-Sheet 1
Fig. 1.
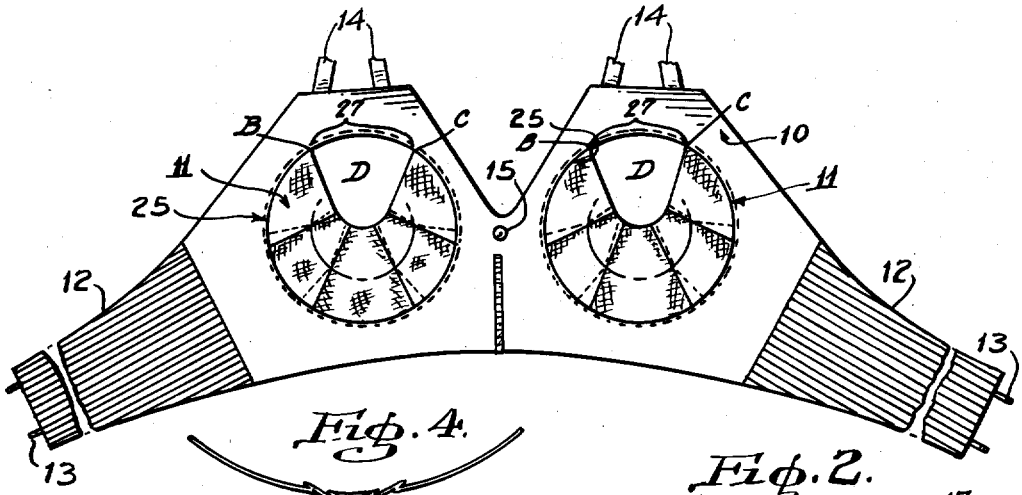
Fig. 4.
Fig. 2.
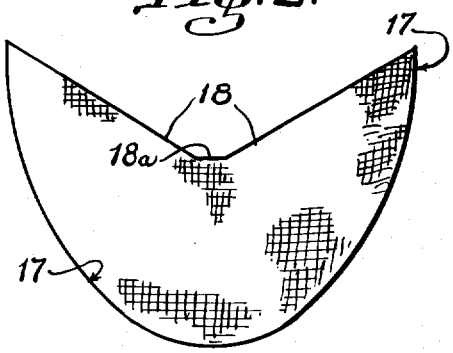
Fig. 3.
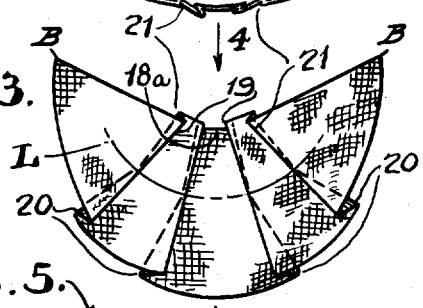
Fig. 5.
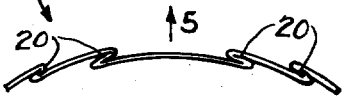
Fig. 8.
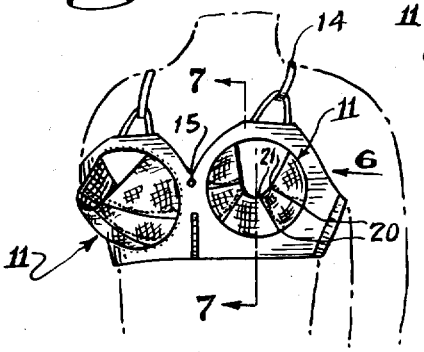
Fig. 6.
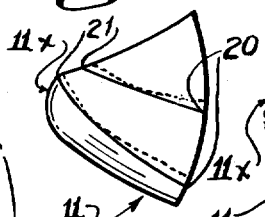
Fig. 7.
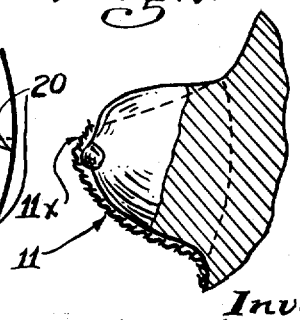
Inventor.
Fred V. Graf
By: Albert H. Merrill
ATTORNEY.

BRASSIERE

Original Filed June 14, 1950 2 Sheets-Sheet 2

Inventor.
Fred V. Graf
By: Albert H. Merrill
Attorney.

United States Patent Office

Re. 24,111

Reissued Jan. 17, 1956

24,111

BRASSIERE

Fred V. Graf, Los Angeles, Calif.

Original No. 2,615,164, dated October 28, 1952, Serial No. 168,091, June 14, 1950. Application for reissue October 11, 1954, Serial No. 461,703

7 Claims. (Cl. 2—42)

Matter enclosed in heavy brackets [ ] appears in the original patent but forms no part of this reissue specification; matter printed in italics indicates the additions made by reissue.

This invention relates to a brassiere, and more particularly to a brassiere wherein an improved means is used to impart to the breast cups a desirable, more comfortable dome shape; and pertains to a modification of the brassiere shown in my copending application Serial Number 32,822, filed June 14, 1948, now Patent No. 2,635,241.

Heretofore in manufacturing brassieres it has been a common practice to cut out a number of independent segments of sheet material and sew them to each other in a breast cup forming assembly. This has been a somewhat tedious and time consuming operation.

Accordingly it is an object of this invention to provide a brassiere wherein the portions of sheet material which combine to make each breast supporting cup are maintained in one piece, thus expediting constructing the breast cup, and at the same time aiding the manufacturer in providing the complete breast cups with the desired curvatures or convexities necessary to conform them accurately and comfortable to the breasts of the wearer of the brassiere.

*It is a further object of my invention to provide a brassiere having a pair of elastic band portions which are attached to the opposite ends of the body portion, encircling the body with continuous elastic from one end of the body portion to the other.*

Other objects, advantages and features of the invention will hereinafter appear.

Referring to the accompanying drawings, which illustrate preferred embodiments of the invention, which has been reduced to practice.

Fig. 1 is a front elevation of the brassiere, portions of the attached elastic band being broken out to contract the view.

Fig. 2 is a plan view of the pattern for each twin breast cup, showing the shape of the piece of cloth for the breast cup before it is folded and stitched into the cup shape.

Fig. 3 is a front view of one of the completed breast cup blanks, separately shown.

Figs. 4 and 5 are, respectively, upper and lower views of the breast cup blank shown in Fig. 3, the view points of the observer being indicated by the arrows 4 and 5.

Fig. 6 is a side elevation of the breast cup shown in Fig. 8, looking in the direction indicated by the arrow 6.

Fig. 7 is a vertical section through one of the breast cups shown in Fig. 8, the scale being enlarged and the plane of section indicated by angular line 7—7, on the latter view, the front part of the breast of the wearer being shown in elevation and the rear part of her breast being sectioned.

Fig. 8 is a perspective view, on a reduced scale, of the brassiere, in place upon the body of the wearer.

Figure 9:
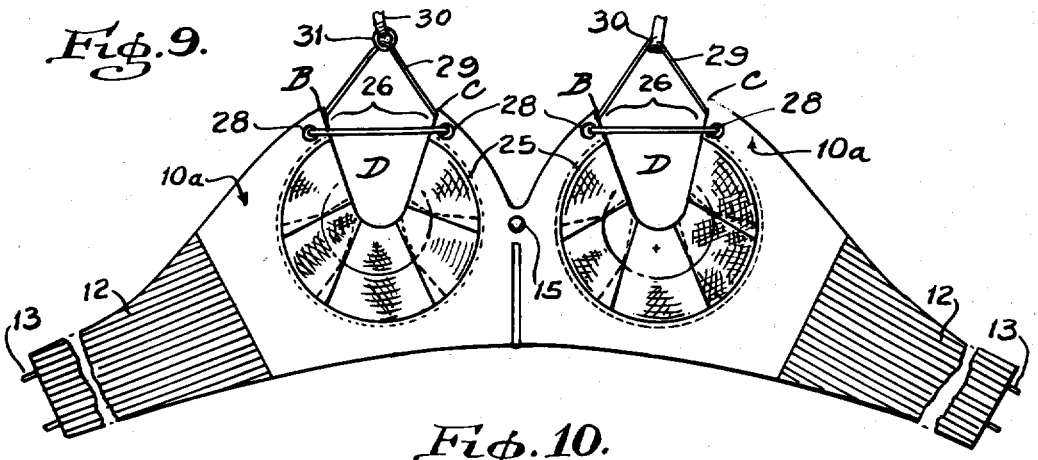

Fig. 9 is a front elevation of a modification of the brassiere, portions of the attaching band being broken out to contract the view.

Figure 10:
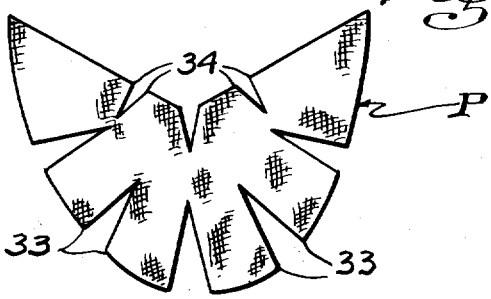

Fig. 10 is a plan view of a templet to be used in making the breast cups, or this view may be taken to represent the sheet for the breast cup cut out preparatory to being sewed into a slightly different breast cup formation.

Figure 11:
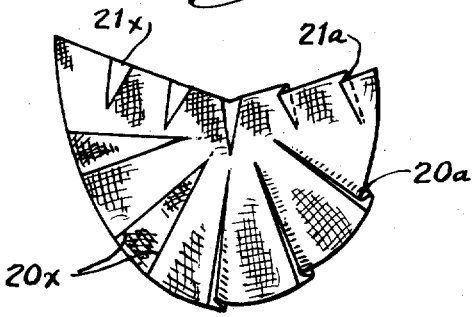

Fig. 11 is an outside face view of a breast cup forming sheet folded throughout its right half as viewed in the drawing, to the proper condition for stitching.

Figure 12:
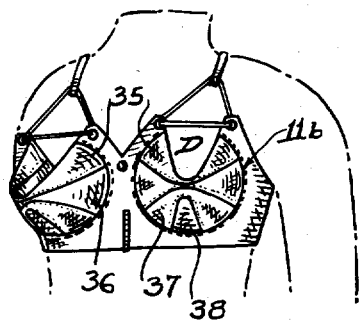

Fig. 12 is a perspective view showing, on a reduced scale, the brassiere of Fig. 9 in place upon the body of the wearer, the breast cups being slightly modified.

Figure 13:
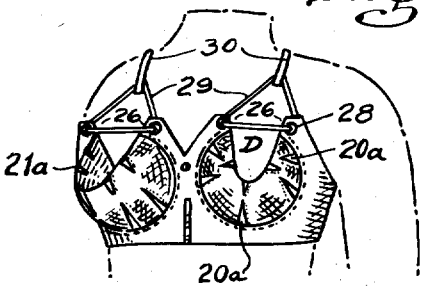

Fig. 13 is a perspective view showing, on the scale of Fig. 12, a brassiere wherein each breast cup is made of a sheet of fabric folded in the manner illustrated in Fig. 11.

Figure 14:
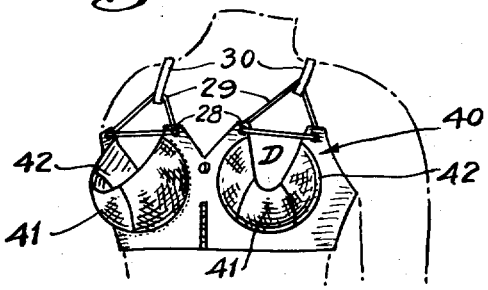

Fig. 14 differs from Figs. 12 and 13 only in that a further modification of the breast cup is shown.

Referring in detail to Figs. 1 to 7 of the drawings, the brassiere shown comprises a partly divided body portion 10 which overlies the chest of the wearer and which carries the open top breast cups 11, body encircling elastic band portions 12 carrying at their outer end fasteners 13, branched shoulder straps 14 which connect the portions of the brassiere above the breast cups with said shoulder straps. *The elastic band portions 12 join together at their free ends to provide a continuous elastic portion extending from one end of body portion 10 to the other. The elastic band portions 12 are tapered, with their widest portions being attached to the ends of body member 10 and their narrowest portions being adjacent their opposite free ends.* Between the breast cups is shown the male member 15 of a two part fastener which will be used to cause a slip worn over the brassiere to conform to the shape of the breast cups.

The twin breast cups 11 are made of suitable soft, pliable sheet material, the pattern for which is shown in Fig. 2, where it is seen that said pattern is that of a modified semi-ellipse with a curved edge portion 17 and a broadly V-shaped edge portion 18, and a short horizontal line 18a forms a truncated V to make Fig. 2 harmonize with Fig. 3, the ellipse being divided transversely of its long axis by its latter edge portion. The apex of this substantially V-shaped edge portion is located in the long axis of said ellipse and is shown slightly blunted, as indicated at 18a. Figure 2 further shows the straight edges of the V being approximately 120°.

After cutting out the pattern shown in Fig. 2 the next step in making a breast cup is to form in said pattern a plurality of radial folds 19, shown in Fig. 3, where it is seen that the formation of said folds produces a series of substantially triangular tucks or folds 19, 20 which start at the base of the cup and progressively decrease from the base of the cup toward the approximate center line and flare out again toward the upper part of the cup, so that the appearance of the cup is like that of an "igloo."

In Fig. 4, the observer looks down upon the partly shaped convex breast cup, seeing the upper tucks 21, and in Fig. 5 he looks up and sees the lower tucks 20. In order to complete each breast cup its entire curved edge portion from B to C as shown in Figs. 1 and 9 is stitched into the circular opening 25 will surround about four-fifths of the aperture 25 leaving an open space D of approximately one fifth 27 of aperture 25 in body portion 10, Fig. 1.

In Fig. 9, the breast cup opening D continues evenly with the open top body portion 26.

The opening D in the breast cups is shown in Figs. 9, 12, 13, 14 and 15. Said breast cups have a larger cubic inch displacement than the conventional breast cups, due, to the hollow semi-spherical design likened to an "Eskimo igloo" as shown in Fig. 15 and will give the larger breasts a much smaller appearance, together with a firm and comfortable support.

Fig. 6 is a side elevation illustrating a breast cup of the same general shape as the breast cups shown in Figs. 1 and 8, the tucks 20 and 21 being clearly shown.

In Fig. 7 the breast cup 11 is shown having an upwardly extending front part 11x that may terminate slightly below, or, as shown, slightly overlie the nipple, of the wearer, and the upper part of the breast being exposed.

The tucks shown in Fig. 8 correspond to the pattern of the tucks of Fig. 3.

The body portion 10a of the brassiere shown in Fig. 9 is similar to that of the brassiere shown in Fig. 1 except that a portion is cut out of the body piece leaving an open space 26, at the upper end of the body portion **10*a*. An eyelet hole 28 is provided, through which a continuous cord or strip 29 is fed, said strip passing through the shoulder strap loop 30, or metal ring 31**.

The pattern P shown in Fig. 10 may be superimposed upon the sheet of material from which a breast cup is to be made and then its notches 33 and 34 be used to guide a pencil in marking the pleats to be made in forming the tucks shown in Fig. 11. Also a piece of cloth cut according to said pattern may be sewed together in such a manner as to close up said notches 33 and 34 and thus be formed into the desired dome shaped breast cup, as shown in Fig. 13.

In Fig. 12 each breast cup 11b is shown having a modified side to side upper double segment 35, middle segment 36 and lower segments 37 and 38.

In Fig. 13 are shown lower tucks 20a and upper tuck 21a, corresponding respectively to the tucks 20a and 21a of Fig. 11. These tucks all result from folding and then sewing according to the markings 20x and 21x shown on the left half of Fig. 11.

In Fig. 14 each modified breast cup 40 is shown composed of a lower central section 41 to each side of which is sewed a lateral section 42.

I claim:

1. A brassiere comprising a body encircling band having breast receiving apertures therein which are substantially surrounded by circular edges, each aperture being provided with a cup having a substantially U-shaped opening in its upper edge, and a curved lower edge secured to said circular edge of each aperture and substantially covering said aperture, said body encircling band having a cutout above each aperture, said cutout and said U-shaped edge forming an open top brassiere cup, and securing means attached to the free edges of said cutout adjacent said aperture.

2. A blank for forming a brassiere cup comprising a flat sheet of material of semi-elliptical lower edge, two straight edges in the shape of a truncated V extending between the lower ends of said semi-elliptical edge, said straight edges being approximately 120°, the apex of the V being directed into the body of said sheet material and lying on the major axis of the ellipse defined by said semi-elliptical edge, whereby an opening is formed when the edges of the V are drawn toward each other.

3. A brassiere cup of approximately 310 degrees adapted to be secured to the edge of an opening in a brassiere, comprising a semi-spherical cup-like body having a plurality of radially extending folds, each fold progressively decreasing intermediate the edges of said cup to the median line between the inner and outer edges of the cup, each fold flaring outwardly to give a dome shape as to the completed breast cup.

4. In a brassiere, a body encircling band having breast receiving apertures therein, a partially open cup partially closing each of said apertures and stitched to said body encircling band, each of said cups comprising a plurality of substantially triangular sector elements, each of said elements being secured together by folds extending radially between each of said sectors, said folds progressively decreasing intermediate the edges of said cup.

*5. A brassiere comprising a body portion having a pair of breast receiving apertures therein, a pair of elongated elastic band portions, one end of one of said band portions being attached to one end of said body portion and one end of the other of said elastic band portions being attached to the opposite end of said body portion, means adjacent the opposite free ends of said elastic band portions for fastening the same together to provide a continuous elastic portion adapted to encircle the body of the wearer from one end of said body portion to the other, a partially open cup partially closing each of said apertures and stitched to said body portion, each of said cups comprising a plurality of substantially triangular sector elements, each of said elements being secured together by folds extending radially between each of said sectors, said folds progressively decreasing intermediate the edges of said cup.*

*6. A brassiere comprising a body portion having a pair of breast receiving apertures therein, a pair of elongated elastic band portions, one end of one of said elastic band portions being attached to one end of said body portion and one end of the other of said elastic band portions being attached to the opposite end of said body portion, means adjacent the opposite free ends of said elastic band portions for fastening the same together to provide a continuous elastic portion adapted to encircle the body of the wearer from one end of said body portion to the other, and a pair of brassiere cups of approximately 310° secured to the edges of said apertures, each of said brassiere cups comprising a semi-spherical cup-like body having a plurality of radially extending folds, each fold progressively decreasing intermediate the edges of said cup to the median line between the inner and outer edges of the cup, each fold flaring outwardly to give a dome shape to the completed breast cup.*

*7. A brassiere comprising a body portion having a pair of breast receiving apertures therein, a pair of elongated elastic band portions, one end of one of said elastic band portions being attached to one end of said body portion and one end of the other of said elastic band portions being attached to the opposite end of said body portion, means adjacent the opposite free ends of said elastic band portions for fastening the same together to provide a continuous elastic portion adapted to encircle the body of the wearer from one end of said body portion to the other, each of said apertures being substantially surrounded by circular edges, each of said apertures being provided with a cup having a substantially U-shaped opening in its upper edge and a curved lower edge secured to said circular edge of said aperture and substantially covering said aperture, said body portion having a cutout above each aperture, said cutout and said U-shaped edge forming an open top brassiere cup, and securing means attached to the free edges of said cutout adjacent said aperture.*

References Cited in the file of this patent or the original patent

UNITED STATES PATENTS

| | | |
|---|---|---|
| 1,698,070 | Roth | Jan. 8, 1929 |
| 1,748,715 | Imershein | Feb. 25, 1930 |
| 2,121,088 | La Rue | June 21, 1938 |
| 2,418,016 | Edelston | Mar. 25, 1947 |
| 2,443,225 | Cadous | June 15, 1948 |
| 2,501,860 | Becker | Mar. 28, 1950 |
| 2,517,287 | Corbeil | Aug. 1, 1950 |
| 2,578,175 | Cuozzi | Dec. 11, 1951 |

FOREIGN PATENTS

| | | |
|---|---|---|
| 415,023 | Great Britain | Aug. 13, 1934 |